(12) United States Patent
Holgersson et al.

(10) Patent No.: US 12,414,500 B2
(45) Date of Patent: Sep. 16, 2025

(54) OPERATION FOR A ROBOTIC WORK TOOL

(71) Applicant: HUSQVARNA AB, Huskvarna (SE)

(72) Inventors: Jonas Holgersson, Huskvarna (SE);
Marcus Liljedahl, Huskvarna (SE);
Jonas Rangsjö, Linköping (SE);
Andreas Peterson, Jönköping (SE);
Patrik Jägenstedt, Tenhult (SE);
Mattias Kamfors, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 859 days.

(21) Appl. No.: 17/637,111

(22) PCT Filed: Aug. 17, 2020

(86) PCT No.: PCT/SE2020/050792
§ 371 (c)(1),
(2) Date: Feb. 22, 2022

(87) PCT Pub. No.: WO2021/034257
PCT Pub. Date: Feb. 25, 2021

(65) Prior Publication Data
US 2022/0295696 A1    Sep. 22, 2022

(30) Foreign Application Priority Data
Aug. 22, 2019    (SE) .................................. 1950956-1

(51) Int. Cl.
*A01D 34/00*    (2006.01)
*G05D 1/00*    (2006.01)
*A01D 101/00*    (2006.01)

(52) U.S. Cl.
CPC ......... *A01D 34/008* (2013.01); *G05D 1/0274* (2013.01); *A01D 2101/00* (2013.01)

(58) Field of Classification Search
CPC . A01D 34/008; A01D 2101/00; G05D 1/0274
See application file for complete search history.

(56) References Cited

U.S. PATENT DOCUMENTS 10,034,421 B2 *   7/2018   Doughty .............. A01D 34/008
10,518,651 B2 *   12/2019  Svensson ............ B60L 15/2036
(Continued)

FOREIGN PATENT DOCUMENTS

CN   108024502 A   5/2018
EP   3252554 A1    12/2017
(Continued)

OTHER PUBLICATIONS

Jiafu Wan et al. "Cloud robotics: current status and open issues" (2016) IEEE, vol. 4. pp. 2797-2807.*
(Continued)

*Primary Examiner* — Gertrude Arthur Jeanglaude
(74) *Attorney, Agent, or Firm* — Burr & Forman

(57) ABSTRACT

A robotic work tool system comprising at least one robotic work tool arranged to operate in a work area, the robotic work tool comprising at least one sensor and a communication interface, the robotic work tool being configured to establish a connection to a cloud service through said communication interface; receive data gathered by the at least one sensor and transmit the gathered data to the cloud service causing the cloud service to analyze the gathered data; receive operating data from the cloud service; and to operate at least one robotic work tool based on the operating data received from the cloud service.

17 Claims, 6 Drawing Sheets

(56) References Cited

U.S. PATENT DOCUMENTS

| | | | |
|---|---|---|---|
| 2007/0112462 A1* | 5/2007 | Kim | G06N 3/008 700/245 |
| 2015/0158182 A1* | 6/2015 | Farlow | B25J 11/009 901/1 |
| 2017/0364091 A1 | 12/2017 | Bennett et al. | |
| 2018/0024549 A1 | 1/2018 | Hurd | |
| 2018/0255704 A1 | 9/2018 | Kamfors et al. | |
| 2019/0011919 A1 | 1/2019 | O'Brien et al. | |
| 2019/0230850 A1* | 8/2019 | Johnson | B65G 67/02 |

FOREIGN PATENT DOCUMENTS

| | | |
|---|---|---|
| EP | 3508938 A2 | 7/2019 |
| JP | 2016533736 A | 11/2016 |
| JP | 2018007615 A | 1/2018 |
| JP | 6370899 B2 | 8/2018 |
| JP | 2019121365 A | 7/2019 |

OTHER PUBLICATIONS

International Search Report and Written Opinion for International Application No. PCT/SE2020/050792, mailed Sep. 8, 2020.
Swedish Search Report in Swedish patent application No. 1950956-1, dated Feb. 24, 2020.

\* cited by examiner

OPERATION FOR A ROBOTIC WORK TOOL

TECHNICAL FIELD

This application relates to robotic work tools and in particular to a system and a method for performing improved operation for a robotic work tool, such as a lawnmower.

BACKGROUND

Automated or robotic power tools such as robotic lawnmowers are becoming increasingly more popular. In a typical deployment a work area, such as a garden, is enclosed by a boundary cable with the purpose of keeping the robotic lawnmower inside the work area. Additionally or alternatively, the robotic work tool may be arranged to navigate using one or more beacons, such as Ultra Wide Band beacons, or optical beacons. Additionally or alternatively, the robotic work tool may be arranged to navigate using satellite positioning sensors, such as Global Positioning System (GPS) or Global Navigation Satellite System (GLONASS) sensors.

A robotic work tool is typically arranged to operate under different circumstances and the contemporary user requires a wide range of functions from a robotic tool, such as mapping of the work area, advanced scheduling, theft control and so on. The sheer number of functions and their advanced level requires that robotic work tools are properly set up and also trained. The extensive setup is time consuming and may be more difficult and complex than a standard user may be capable of performing, and the training may require additional computer resources and also time to be completed.

Especially for robotic work tool systems where more than one robotic work tool is set up to operate requires additional devices, such as system servers and dedicated communication systems and protocols, which makes such system even more complex to set up and requiring more time to train.

Thus, there is a need for improved setup, training and operation for a robotic work tool, such as a robotic lawnmower.

SUMMARY

It is therefore an object of the teachings of this application to overcome or at least reduce those problems by providing a robotic work tool system comprising at least one robotic work tool arranged to operate in a work area, the robotic work tool comprising at least one sensor and a communication interface, the robotic work tool being configured to establish a connection to a cloud service through said communication interface; receive data gathered by the at least one sensor and transmit the gathered data to the cloud service causing the cloud service to analyze the gathered data; receive operating data from the cloud service; and to operate at least one robotic work tool based on the operating data received from the cloud service.

In one embodiment or combination of embodiments the robotic work tool is a robotic lawnmower.

It is also an object of the teachings of this application to overcome the problems by providing a method for use in a robotic work tool system comprising at least one robotic work tool arranged to operate in a work area, the robotic work tool comprising at least one navigation sensor and a communication interface, the method comprising: the robotic work tool: establishing a connection to a cloud service through said communication interface; and receiving data gathered by the at least one navigation sensor and transmit the gathered data to the cloud service, and the cloud service analyzing the gathered data; and the robotic work tool receiving operating data from the cloud service; and operating based on the operating data received from the cloud service.

It is also an object of the teachings of this application to overcome the problems by providing a cloud service operably connected to a robotic work tool system comprising at least one robotic work tool, the cloud service being configured to establish a connection to the at least one robotic work tool; receive data gathered by the at least one robotic work tool; analyze the gathered data; determine operating data; and to transmit the operating data to the at least one robotic work tool causing the at least one robotic work tool to operate based on the operating data.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein. Like reference numbers refer to like elements throughout.

It should be noted that even though the description given herein will be focused on robotic lawnmowers, the teachings herein may also be applied to, robotic ball collectors, robotic mine sweepers, robotic farming equipment, or other robotic work tools where lift detection is used and where the robotic work tool is susceptible to dust, dirt or other debris.

Figure 1A:
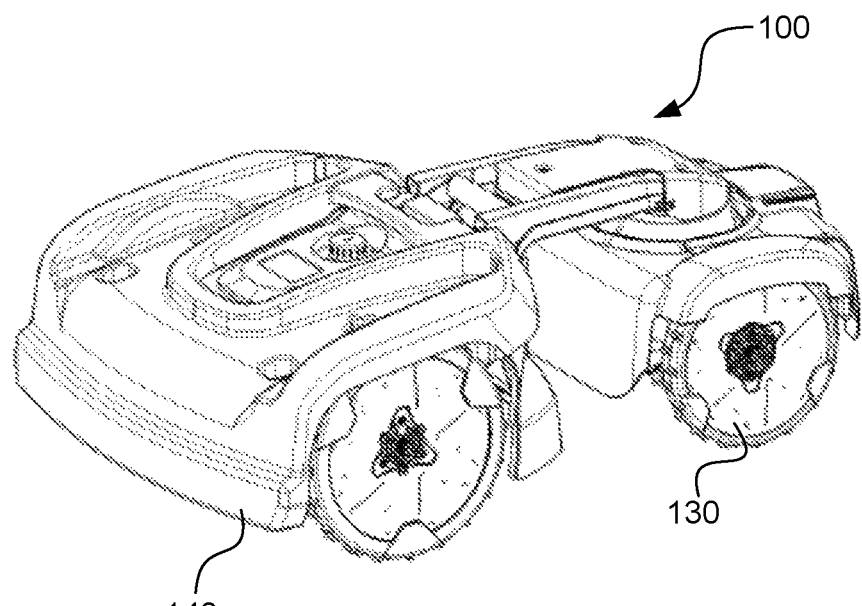
FIG. 1A shows an example of a robotic lawnmower according to one embodiment of the teachings herein.

FIG. 1A shows a perspective view of a robotic working tool 100, here exemplified by a robotic lawnmower 100. It should be noted that although the robotic work tool is exemplified here as a robotic lawnmower, the teachings herein may equally beneficially be implemented in a robotic manure distributor, robotic irrigation tool, robotic leaf collector, or other robotic gardening tool, especially if working in cooperation with a robotic lawnmower. The teachings herein may equally beneficially be implemented in a robotic ball collector. In the example illustrated in FIG. 1A, the robotic lawnmower has a body 140 and a plurality of wheels 130 (only one shown). The robotic lawnmower 100 may comprise charging skids for contacting contact plates (not shown in FIG. 1) when docking into a charging station (not shown in FIG. 1, but referenced 210 in FIG. 2) for receiving a charging current through, and possibly also for transferring information by means of electrical communication between the charging station and the robotic lawnmower 100.

The robotic working tool 100 may be of an articulated or multi-chassis design as in FIG. 1A, having a main or first body part and a trailing or second body part. The two parts are connected by a joint part.

Figure 1B:
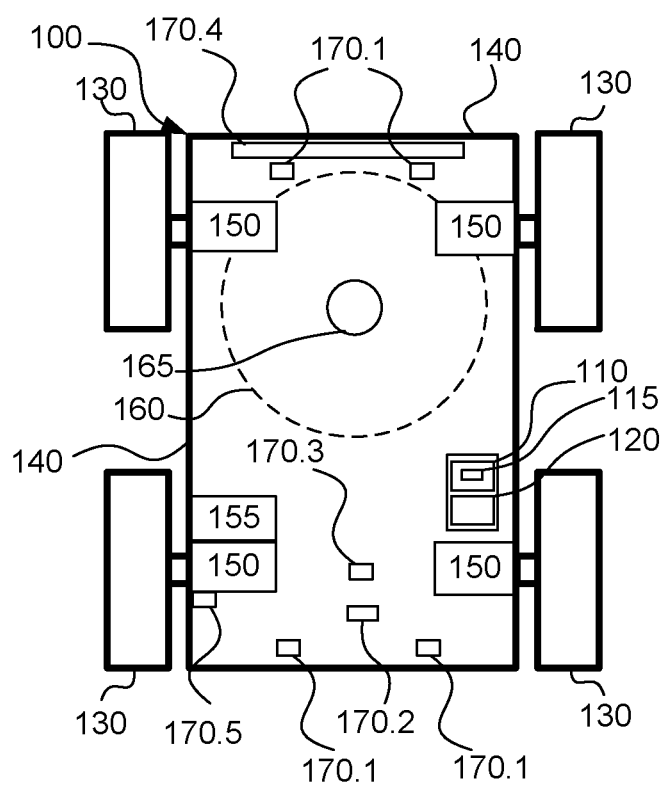
FIG. 1B shows a schematic view of the components of an example of a robotic work tool being a robotic lawnmower according to an example embodiment of the teachings herein.

The robotic working tool 100 may be of a mono-chassis design as in FIG. 1B. FIG. 1B shows a schematic overview of the robotic working tool 100, also exemplified here by a robotic lawnmower 100. In this example embodiment the robotic lawnmower 100 is of a mono-chassis type, having a main body part 140. The main body part 140 substantially houses all components of the robotic lawnmower 100. The robotic lawnmower 100 has a plurality of wheels 130. In the exemplary embodiment of FIG. 1B the robotic lawnmower 100 has four wheels 130, two front wheels and two rear wheels. At least some of the wheels 130 are drivably connected to at least one electric motor 150. It should be noted that even if the description herein is focused on electric motors, combustion engines may alternatively be used, possibly in combination with an electric motor. In the example of FIG. 1B, each of the wheels 130 is connected to a respective electric motor. This allows for driving the wheels 130 independently of one another which, for example, enables steep turning and rotating around a geometrical center for the robotic lawnmower 100. It should be noted though that not all wheels need be connected to each a motor, but the robotic lawnmower 100 may be arranged to be navigated in different manners, for example by sharing one or several motors 150.

The robotic lawnmower 100 also comprises a grass cutting device 160, such as a rotating blade 160 driven by a cutter motor 165. The grass cutting device being an example of a work tool 160 for a robotic work tool 100. The robotic lawnmower 100 also has (at least) one battery 155 for providing power to the motors 150 and/or the cutter motor 165.

The robotic lawnmower 100 also comprises a controller 110 and a computer readable storage medium or memory 120. The controller 110 may be implemented using instructions that enable hardware functionality, for example, by using executable computer program instructions in a general-purpose or special-purpose processor that may be stored on the memory 120 to be executed by such a processor. The controller 110 is configured to read instructions from the memory 120 and execute these instructions to control the operation of the robotic lawnmower 100 including, but not being limited to, the propulsion of the robotic lawnmower. The controller 110 may be implemented using any suitable, available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic lawnmower 100 is further be arranged with a wireless communication interface 115 for communicating with a cloud service (not shown in FIG. 1B, but referenced 250 in FIG. 2), directly or indirectly by communicating through another device, such as a server, a personal computer or smartphone, a second robotic work tool or the charging station. Examples of such wireless communication devices are WiFi® (IEEE 802.11b), Bluetooth®, Global System Mobile (GSM) and LTE (Long Term Evolution), to name a few. In one embodiment, the wireless communication is achieved through the control signal being transmitted in the boundary cable (the sensing of which is wireless).

For enabling the robotic lawnmower 100 to navigate, the robotic work tool 100 is arranged with at least one navigation sensor 170. In one embodiment or combination of embodiments the navigation sensor 170 is a magnetic field sensor 170.1. In an additional or alternative embodiment the navigation sensor 170 is a beacon sensor 170.2. In an additional or alternative embodiment the navigation sensor 170 is a satellite navigation sensor 170.3. In an additional or alternative embodiment the navigation sensor 170 is a collision sensor 170.4. In an additional or alternative embodiment the navigation sensor 170 is a deduced reckoning (or dead reckoning) sensor 170.5.

To enable the robotic lawnmower 100 to navigate with reference to a boundary cable (not shown in FIG. 1B, but referenced 230 in FIG. 2) emitting a magnetic field caused by a control signal (not shown in FIG. 1B, but referenced 235 in FIG. 2) transmitted through the boundary cable, the robotic lawnmower 100 may be further configured to have at least one magnetic field sensor 170.1 arranged to detect the magnetic field (not shown) and for detecting the boundary cable and/or for receiving (and possibly also sending) information from a signal generator (will be discussed with reference to FIG. 2). In some embodiments, the sensors 170.1 may be connected to the controller 110, and the controller 110 may be configured to process and evaluate any signals received from the sensors 170.1. The sensor signals are caused by the magnetic field being generated by the control signal being transmitted through the boundary cable. This enables the controller 110 to determine whether the robotic lawnmower 100 is close to or crossing the boundary cable, or inside or outside an area enclosed by the boundary cable.

It should be noted that the magnetic field sensor(s) 170.1 as well as the boundary cable (referenced 230 in FIG. 2) and any signal generator(s) (referenced 215 in FIG. 2) are optional. The boundary cable may alternatively be used as the main and only perimeter marker. The boundary cable may alternatively simply be used as an additional safety measure. The boundary cable may alternatively be used as the main perimeter marker and other navigation sensors (see below) are used for more detailed or advanced operation.

To enable the robotic lawnmower to navigate using beacons, in one embodiment or combination of embodiments the robotic lawnmower 100 may further comprise at least one beacon receiver or beacon navigation sensor 170.2. The beacon receiver may be a Radio Frequency receiver, such as an Ultra Wide Band (UWB) receiver or sensor, configured to receive signals from a Radio Frequency beacon, such as a UWB beacon. The beacon receiver may be an optical receiver configured to receive signals from an optical beacon.

To enable the robotic lawnmower to navigate using satellites, in one embodiment or combination of embodiments the navigation sensor 170 is a satellite navigation sensor 170.3, such as a GPS receiver (Global Positioning System) or other satellite navigation sensor.

To enable the robotic lawnmower to navigate obstacles and physical limits in a work area, in one embodiment or combination of embodiments the navigation sensor 170 is a collision detection sensor 170.4. A collision sensor may be optical, electromagnetic or mechanical, or any combination thereof. As a skilled person would understand there are many different variations of collision detection sensors. The general operation of a collision detection sensor is that it senses the range to an object, either through sending out a signal and timing the reflection, by capturing an image that is processed or by sensing physical contact.

To enable the robotic lawnmower 100 to navigate without outside input (such as beacon or satellite signals) the navigation sensor 170 comprises one or more deduced reckoning sensors 170.5. In one embodiment or combination of embodiments at least one deduced reckoning sensor is a direction sensor 170.5, such as a compass, an accelerometer or a gyroscope. In one embodiment or combination of embodiments at least one deduced reckoning sensor 170.5 is a distance sensor, such as an accelerometer or gyroscope with timing function, or an odometer, such as a wheel turns counter. In one embodiment or combination of embodiments, the deduced navigation sensor 170.5 is a barometer utilized for determining elevational travel. Such a barometer may also be used as an environmental sensor for determining weather changes.

The robotic lawnmower may also comprise other sensors 170, for example a rain sensor, a cutting force sensor, a grass height sensor, an inclinometer, a temperature sensor, a light intensity sensor, a barometer, or other sensors.

Figure 2:
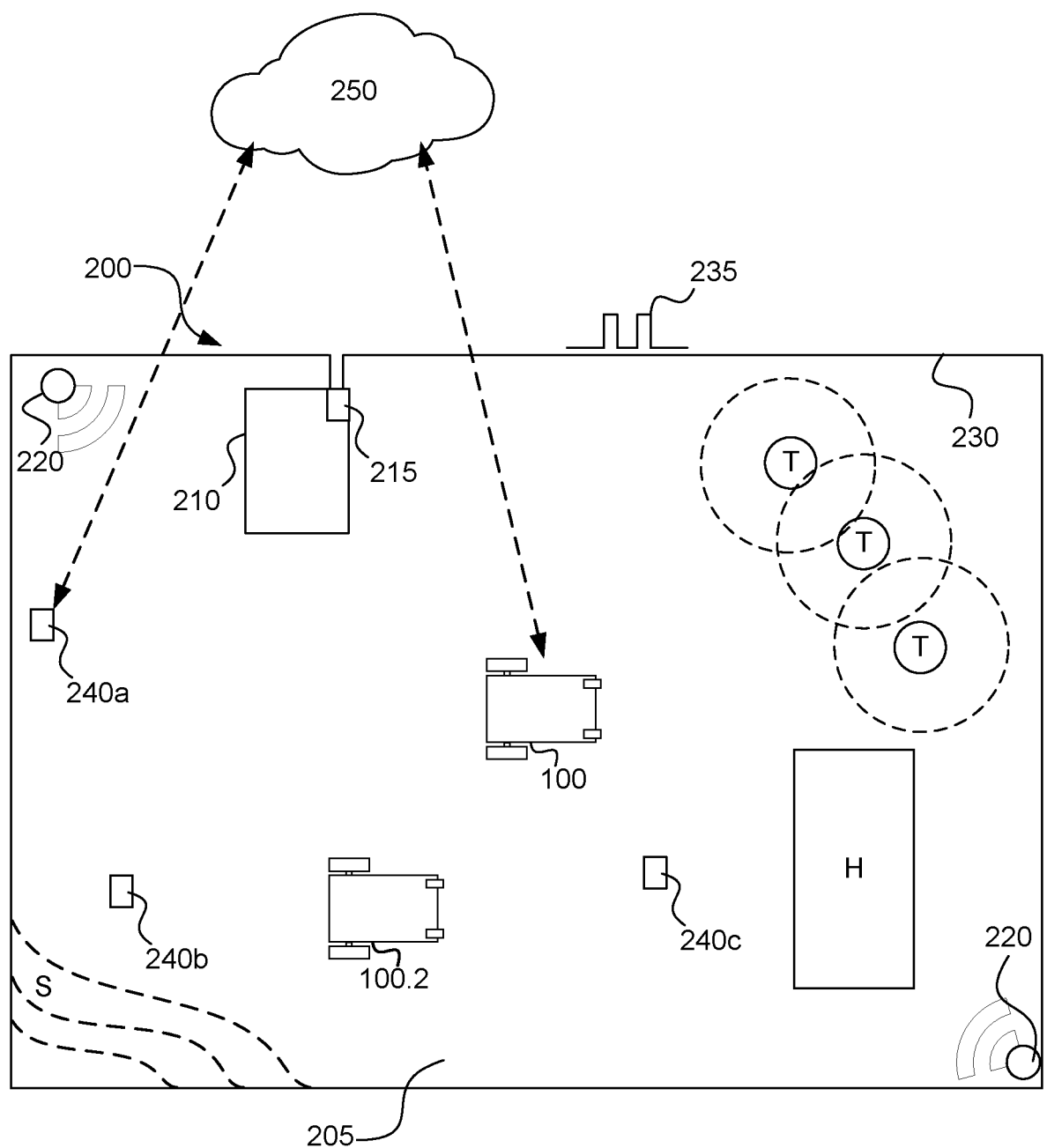
FIG. 2 shows an example of a robotic work tool system being a robotic lawnmower system according to an example embodiment of the teachings herein.

FIG. 2 shows a schematic view of a robotic working tool system 200 in one embodiment or combination of embodiments. The schematic view is not to scale. The robotic working tool system 200 comprises a charging station 210 having a signal generator 215 and a robotic working tool 100. As with FIGS. 1A and 1B, the robotic working tool is exemplified by a robotic lawnmower, whereby the robotic work tool system may be a robotic lawnmower system or a system comprising a combinations of robotic work tools, one being a robotic lawnmower, but the teachings herein may also be applied to other robotic working tools adapted to operate within a work area.

The robotic working tool system 200 may also comprise a boundary cable 230 arranged to enclose a work area 205, in which the robotic lawnmower 100 is supposed to serve. A control signal 235 generated by the signal generator 215 is transmitted through the boundary cable 230 causing a magnetic field (not shown) to be emitted.

The robotic working tool system 220 may also optionally comprise at least one beacon 220 to enable the robotic lawnmower to navigate the work area using the beacon navigation sensor(s) 170.2.

The work area 205 is in this application exemplified as a garden, but can also be other work areas as would be understood. The garden contains a number of obstacles (O), exemplified herein by a number (3) of trees (T) and a house structure (H). The trees are marked both with respect to their trunks (filled lines) and the extension of their foliage (dashed lines). The garden may also comprise other features such as a sloping part, indicated by dashed contour lines referenced "S" in FIG. 2

The robotic lawnmower is in one embodiment or combination of embodiments configure to determine it the robotic lawnmower is operating in a new work area 205. The determination may be performed at startup, during a setup mode or dynamically during operation, or a combination of any or all.

In one such embodiment, the robotic lawnmower 100 is configured to determine that it is in a new work area by identifying an identification for the charging station or the work area, the charging station representing the work area, and compare it to a register of (known) charging stations. The register may be stored locally in the memory 120 of the robotic lawnmower and/or centrally in the cloud service. The identification of the charging station may be retrieved by sensing and processing the control signal in an embodiment where the signal generator transmits an identifier for the charging station as part of or appended to the control signal 235. In one embodiment or combination of embodiments, the identification may be retrieved through a communication channel between the robotic lawnmower 100 and the charging station 210. In one embodiment or combination of embodiments, the identification may be based on the current position of the robotic lawnmower 100. In one such embodiment, the robotic lawnmower 100 is configured to determine its current position and query a register of charging stations or work areas based on position to determine if the work area is a new work area. In such an embodiment, the actual identity of the charging station or work area may then be omitted and replaced by simply determining whether the work area is new to the robotic lawnmower 100. For the purpose of this application, the determination of the current position will be considered to be a determination of an identifier for the charging station or work area, as the position corresponds to the work area or charging station.

The robotic lawnmower system 200 may additionally comprise a second (or more) additional robotic work tools 100.2. The additional robotic work tool(s) 100.2 may be of the same type as the robotic lawnmower 100 or they may be of different types, and also need not be of the same type.

As has been discussed with reference to FIG. 1B, the robotic lawnmower 100 is arranged to contact a cloud service 250 through the communication interface 115. As a cloud service does not require a dedicated connection, the connection to the cloud service may be established directly or indirectly.

The inventors have realized that some prior art systems that utilize dedicated servers suffer from drawbacks. A dedicated server is a physical server that is used entirely for one need. The dedicated server requires a proprietary interface and protocols and require capacity and expertise to manage ongoing maintenance, patches and upgrades. The inventors have realized that a simple solution is available in going against predominant thinking in the area of garden and forest robotics in utilizing a cloud service to overcome all these problems.

The inventors have realized that by utilizing the vast processing resources, the easy access and the centralized availability available to a cloud server, sensor data from several different sensors, possibly also from several different robotic lawnmowers 100 can be collated and analysed to provide an improved operation of a robotic lawnmower 100. The data to be sent can be sensor values of the navigation sensors (GPS, loop sensors, guide sensors, collision sensors, gyroscope, compass, wheel rotation tics and accelerometer), but also from other environmental sensors such as a barometer. The sensor data can be processed in the cloud, or pre-processed in the robotic lawnmower before being transmitted to the cloud service 250. The pre-processing may be as simple as a transformation and/or a combination of data, or more complicated.

In general, the robotic work tool according to herein can be seen as to cause the cloud service to perform certain functions and/or analysis by transmitting the data needed for such analysis or functions.

The data may be analysed as instantaneous data points and/or over time to establish patterns or trends.

As a work area does not change significantly over time, data can be gathered over longer periods of time and subjected to various statistical methods, the large data gathered providing reliable basis for the statistics.

The data gathered can be used by the cloud service to generate a map of a work area. By combining location data with sensor data (such as collision data) and elevation data a general outline of the work area can be provided marking all objects (indicated as where collisions occur consistently over time) and slopes (indicated as locations with consistent elevation changes).

The data gathered can be used by the cloud service to handle segmentation of the work area. Over time, the analysis made by the cloud service will provide indications of which sub areas or segments of the work area that need most or least work. Trends such as if one sub area is serviced before another, certain benefits arise, may also be realized through the analysis over time. For example, if it is noted that if the air pressure is low, a certain segment requires double time to be serviced properly, this area may be segmented and serviced accordingly when the air pressure drops (probably indicating rain).

The cloud service may also be arranged to base path finding algorithm on the gathered data.

As the inventors have realized, as most work areas for a type of robotic work tool, such as a garden for a robotic lawnmower, comprise essentially the same components; grass lawn, trees, some rocks, possibly some gravel and some buildings, data may be shared between different robotic lawnmowers. By gathering data for a first robotic work tool 100, such as a robotic lawnmower, and a second robotic work tool 100.2, general trends and correspondences may be retrieved from the analysis. As a map for a first robotic work tool 100 is generated based on data gathered over time, where the data gathered is compared to several criteria for identifying or determining the object to be put on the map, there are benefits in utilizing data gathered by other robotic work tools, as such data is used to train the determination for the first robotic work tool. For example, if a collision detection sensor provides input indicating a collision at the same location as an accelerometer provides data indicating an abrupt stop followed by shaking, and such data is trending also for other robotic lawnmowers, it can be assumed that there is a rock or wall at that location, without having to repeat over time, relying on data gathered for other robotic work tools to train the analysis for the first robotic work tool. The cloud service is thus arranged to train its analysis for a first robotic work tool based on data gathered for a second robotic work tool.

As indicated above, the second robotic work tool may thus not be operating in the same work area as the first robotic work tool, whereby trends and common corresponding data may be utilized beneficially. Alternatively or additionally, the second robotic work tool may be a robotic work tool already operating in the work area and/or being replaced by the first robotic work tool, whereby historic data is utilized by the first robotic work tool.

The inventors have also realized that utilizing the cloud service, the startup of a new robotic work tool in a work area may be made more efficient by all robotic work tools uploading their work area settings to the cloud service 250. As a robotic work tool determines that it is started up or installed in a previously not worked work area (see above for a manner of identifying a work area), the robotic work tool may query the settings form the cloud service.

In this manner, it is easy to allow different robotic work tools to operate in new work areas, thereby enabling an easy replacement of robotic work tools or collaborations of robotic work tools. As an robotic work tool downloads work area settings based on the work area identifiers, more than one robotic work tool may operate in the same work area, contrary to the dedicated prior art systems requiring double system setups.

In one embodiment or combination of embodiments, the cloud service is also arranged to determine if the robotic work tool is authorized to operate in a work area. This is useful for unauthorized use of robotic work tools and provides theft protection as a stolen robotic work tool will not be able to be started in any work area other than its home work area.

In one embodiment the cloud service is arranged to coordinate a first and a second robotic work tool so that a work area is best serviced. The coordination is based on the capabilities of the first and second robotic work tools. For example if the first robotic work tool 100.1 has a longer range than the second robotic work tool 100.2, the first robotic work tool will be controlled to operate in segments (or sub areas) farther from the charging station, and the second robotic work tool will be controlled to operate in segments (or sub areas) closer to the charging station.

If a segment contains slopes of a high inclination, the robotic work tool having the best climbing ability will be controlled to service such a segment. The climbing capability may be specified in and provided by the robotic work tool, or it may be retrieved from the analysis of the data gathered by that robotic work tool. A consistent or regularly higher speed (or lower power consumption) in slopes for a first robotic work tool (individual robotic work tool and/or model of robotic work tool) than for a second robotic work tool (individual robotic work tool and/or model of robotic work tool) indicates a better climbing capability for the first robotic work tool (individual robotic work tool and/or model of robotic work tool). This saves a user or operator from having to buy two advanced robotic work tools as an advanced robotic work tool can be utilized to handle complicated segments or tasks, and a simpler model can be utilized to handle simpler segments and/or tasks.

The cloud service is in one embodiment or combination of embodiments arranged to estimate the height of the grass being cut in a work area for a robotic lawnmower 100. The grass height may be based on sensor data (such as load on the motor 160). The grass height may also be estimated based on growth projection models and/or weather data for the work area. Based on the estimated grass height and/or growth in a segment, the cloud service can control the first and the second robotic work tool so that the segment is properly serviced (i.e. obtains a level of service so that a desired result (grass height) is achieved. This feature will reduce the cutting time and thereby save energy consumption, reduce wear of the robotic lawnmower and on the grass.

The user will thereby save money and time not to buy two advanced mowers for steep areas or make double installations.

As has been disclosed in the above, the inventors have realized several problems with the contemporary prior art systems, and also realized simple and inventive manners for overcoming these problems. Supplementary descriptions of these solutions will be given below with reference to FIGS. 3, 4, 5, 6, 7, 8 and 9. It should be noted that any, some or all of the embodiments disclosed herein may be combined in a robotic work tool and/or a robotic work tool system according to the teachings herein.

Figure 3:
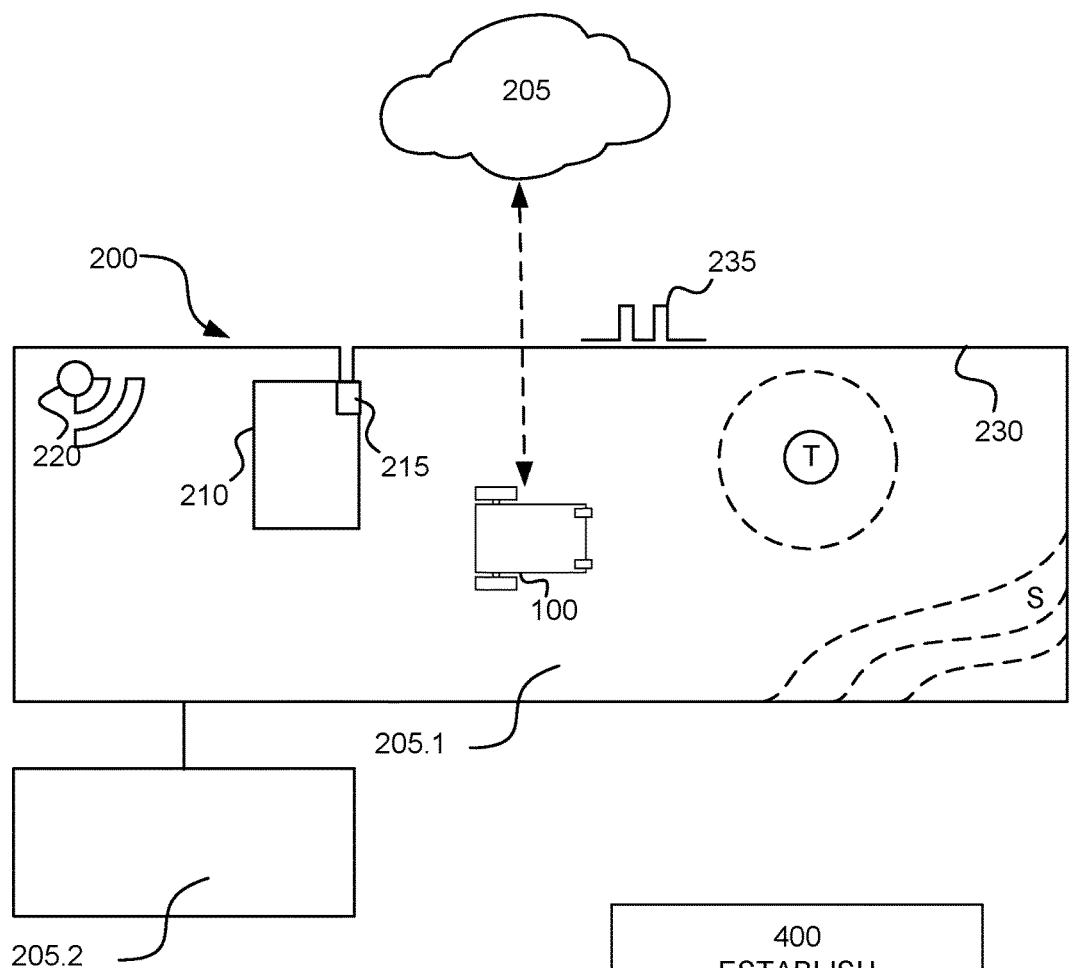
FIG. 3 shows an example of a robotic work tool system being a robotic lawnmower system according to an example embodiment of the teachings herein.

FIG. 3 shows a schematic view of a robotic work tool system 200, exemplified herein by a robotic lawnmower system. In one embodiment or combination of embodiments, the robotic lawnmower system 200 is a robotic lawnmower system 200 as disclosed with reference to FIG. 2. As in FIG. 2, the robotic lawnmower system 200 comprises a robotic work tool 100, exemplified by a robotic lawnmower 100. In one embodiment or combination of embodiments, the robotic lawnmower 100 is a robotic lawnmower as disclosed with reference to FIGS. 1A and 1B.

The robotic lawnmower 100 is placed in a work area 250 and the robotic lawnmower 100 is configured to determine which settings should be used for the work area 205. The determination may be done during setup of the robotic lawnmower system or the robotic lawnmower. Alternatively or additionally, the determination may be done during startup of the robotic lawnmower 100. Alternatively or additionally, the determination may be done during operation of the robotic lawnmower 100, such as at regular intervals. Alternatively or additionally, the determination may be done during operation of the robotic lawnmower 100, such as when a control signal is lost or not reliably received. Alternatively or additionally, the determination may be done during operation of the robotic lawnmower 100, such as when it is determined that a border of the work area has been crossed (by detecting a crossing of a border cable and/or by determining a border crossing based on a determined location.

Figure 4:
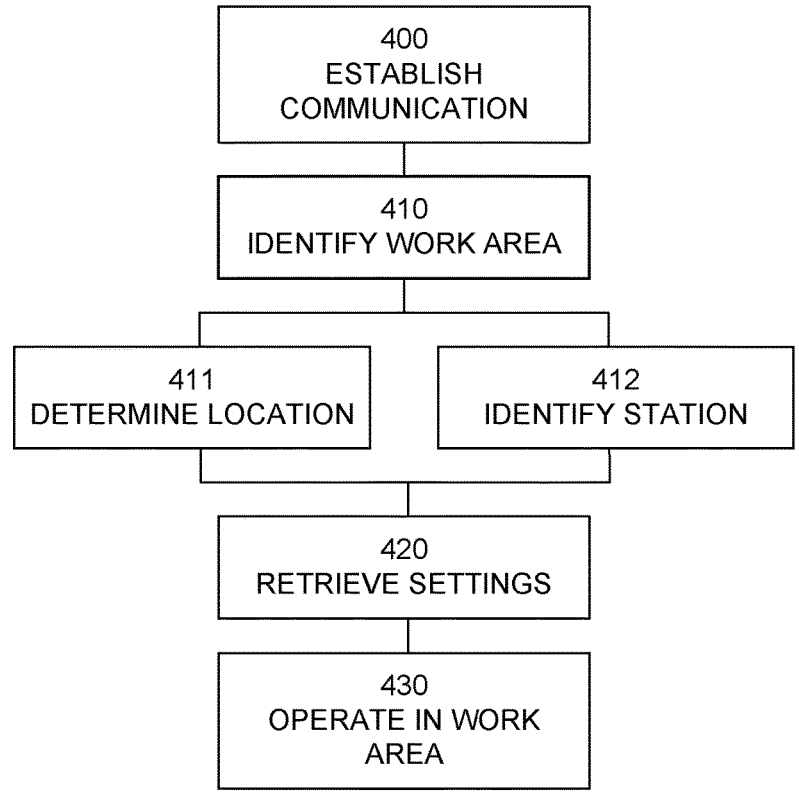
FIG. 4 shows a corresponding flowchart for a method according to an example embodiment of the teachings herein.

FIG. 4 shows a flowchart for a general method of determining which settings should be used for a work area. A communication channel or connection with a cloud service 250 is established 400 by the robotic lawnmower 100. In order to determine the settings to be used for the work area 205, the robotic lawnmower 100 identifies 410 the work area 205.

In one embodiment or combination of embodiments, the identification of the work area is a direct identification of the work area. In one such embodiment, the robotic lawnmower determines a location 411 utilizing the navigation sensor 170, such as a beacon navigation sensor 170.2 or a satellite navigation sensor 170.3. In one such embodiment, the robotic lawnmower determines an identity of the signal generator 412 utilizing the navigation sensor 170, such as a magnetic field sensor 170.1, whereby the identity of the signal generator (corresponding to the work area) is determined based on the received control signal 235.

In one embodiment or combination of embodiments, the identification of the work area is an indirect identification of the work area, by identifying the charging station (assumed to comprise a signal generator) corresponding to the work area. In one such embodiment, the robotic lawnmower determines an identity of the signal generator 412 utilizing the navigation sensor 170, such as a magnetic field sensor 170.1, whereby the identity of the signal generator (corresponding to the work area) is determine based on the received control signal 235.

In one embodiment or combination of embodiments, the determination of the identifier for the work area is made by the controller of the robotic lawnmower 100. In one embodiment or combination of embodiments, the determination of the identifier for the work area is caused by the controller of the robotic lawnmower 100 to be made by the cloud server 250 (by requesting it or by responding to a request).

As an identifier for the work area has been determined, corresponding settings for the work area is retrieved 420 and the robotic lawnmower 100 loads them into the memory 120 and is ready to operate 430 in the work area 205.

In FIG. 3 the work area 205 comprises two work areas or segments, a first (main) work area or segment 205.1 and a second work area or segment 205.2. In the example of FIG. 3, the second work area 205.2 does not have a charging station, nor a signal generator. In prior art systems, if a robotic work tool is to be set to operate in such a (second) work area, a special mode for operating in a work area without charging capabilities (a secondary work area mode) needed to be entered manually by an operator. The special mode directs how the robotic work tool is to handle charging situations.

In one embodiment or combination of embodiments, instructions for entering such a mode is comprised in the settings for the work area. In order for the first work area to be distinguishable from the second work area, at least two different solutions exist (that may be combined). The first manner is to utilize a second guide or boundary cable (not shown explicitly but assumed to be indicated through the general boundary cable reference 230 in FIG. 3). The second manner is to determine a location for the second work area 205.2.

The user will thus not have to enter the secondary work area mode in the mower when it is used in a secondary area.

Figure 5:
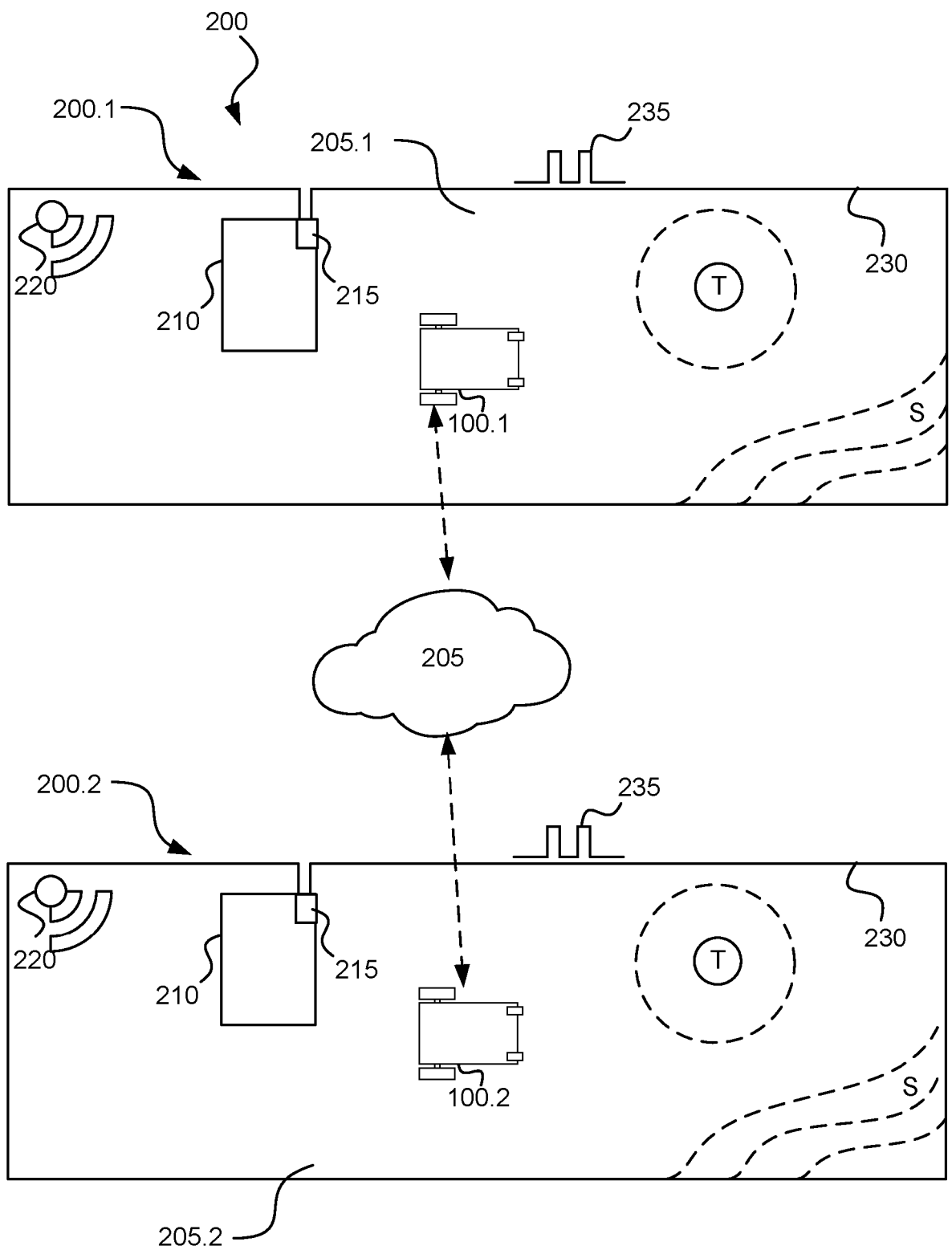
FIG. 5 shows an example of a robotic work tool system being a robotic lawnmower system according to an example embodiment of the teachings herein.

FIG. 5 shows a schematic view of a robotic work tool system 200, exemplified herein by a robotic lawnmower system. In one embodiment or combination of embodiments, the robotic lawnmower system 200 is a robotic lawnmower system 200 as disclosed with reference to FIGS. 2 and/or 3. The robotic lawnmower system 200 comprises at least two robotic work tools 100, exemplified by robotic lawnmowers 100. In one embodiment or combination of embodiments, the robotic lawnmower 100 is a robotic lawnmower as disclosed with reference to FIGS. 1A and 1B.

In the example of FIG. 5, the robotic work tool system 200 comprises at least two robotic work tool subsystems, a first system 200.1 and a second system 200.2. Even though the two robotic work tool systems 200.1 and 200.2 are shown to be identical, this is only for illustrative purposes and a skilled person would understand that the two systems may differ.

FIG. 5 shows how a first robotic lawnmower 100 is arranged to establish a connection in order to retrieve data, such as settings, from a cloud service 250. FIG. 5 shows how a second robotic lawnmower 100 is arranged to establish a connection in order to retrieve data, such as settings, from the same cloud service 250. If the robotic lawnmowers are arranged according to the teachings herein, they may be used in either of the work areas. As one robotic work tool 100 is moved from one work area to another, the robotic work tool 100 retrieves new settings from the cloud service. As the settings are received from the cloud service, the settings may easily be loaded into more than one robotic work tool, thereby enabling a simple and easy use of more than one robotic work tool in a work area, which use of multiple robotic work tools is easy to change dynamically or repeatedly.

As discussed in the above, the cloud service 250 is, in one embodiment or combination of embodiments, configured to generate a map of a work area, based on sensor data gathered by a robotic work tool operating in the work area.

As the cloud service has a lot more processing power available, the cloud service can utilize more advanced algorithms for processing the gathered data and to generate the map.

Furthermore, as the inventors have realized, because the cloud service 250 is associated with more than one robotic work tool, the cloud service 250 is, in one embodiment or combination of embodiments, configured to generate a map of a work area based on data gathered from a first robotic work tool and on data gathered from a second robotic work tool. This enables the map to be generated faster as more data will be made available for generating the map. It also enables for a replacement or new robotic work tool to benefit from a replaced or older robotic work tool's data gathering. It may also enable two or more robotic work tools operating in a same work area for generating a map fast during an installation or setup of the work area.

In one embodiment or combination of embodiments, the data gathered from the second robotic work tool is associated with the work area. In an additional or alternative embodiment, the data gathered from the second robotic work tool is associated with another work area and/or the second robotic work tool. This enables for data trends for robotic work tools, possibly of a particular type and/or arranged with a type of sensor, so that more accurate estimations based on the sensor data may be achieved, such as differentiating between different surfaces, different objects, different structures, and so on.

In one embodiment, the cloud service is configured to determine the operating data based on the received gathered data. In addition, in one embodiment, the cloud service is further configured to determine the operating data based on gathered data previously transmitted to the cloud service. This enables the cloud service to take into account previously gathered data which may influence the operating data. For example, if the gathered data indicates a grass height, then the previously gathered data in comparison with the currently gathered data will indicate a growth rate and a change to the operating schedule may be determined to keep the grass height within acceptable parameters. In addition or as an alternative, in one embodiment, the cloud service is further configured to determine the operating data based on operating data previously determined by the cloud service. This enables the cloud service to correct or amend operating data based on knowledge of the previously transmitted operating data. For example, if the gathered data represents grass height and the operating data represents operating intensity and/or frequency, a comparison of the two may lead to that the operating intensity and/or frequency is altered, for example by increasing it if the gathered grass height is above acceptable limits or decreasing it f the gathered grass height is below acceptable limits.

Figure 6:
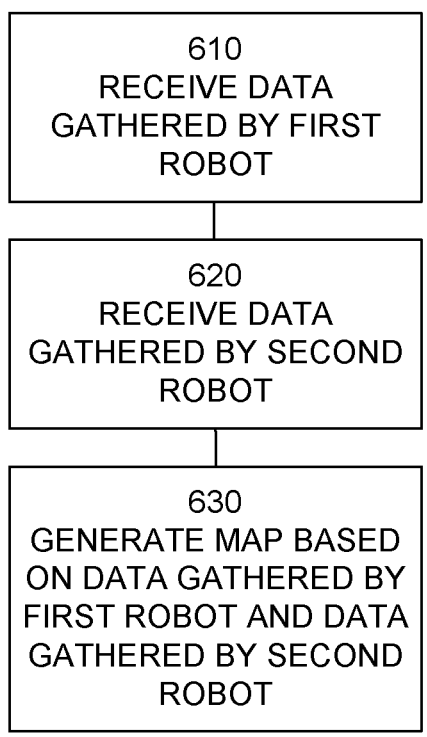
FIG. 6 shows a corresponding flowchart for a method according to an example embodiment of the teachings herein.

FIG. 6 is a flow chart for a general method of generating a map of a work area according to the teachings herein. The cloud service 250 receives 610 sensor data gathered by a first robotic work tool 100.1. The cloud service 250 furthermore receives 620 sensor data gathered by a second robotic work tool 100.2. In one embodiment or combination of embodiments, the data gathered by the second robotic work tool is received from the second robotic work tool 100.2. In one embodiment or combination of embodiments, the data gathered by the second robotic work tool is received from a storage or memory associated with the second robotic work tool 100.2. This enables a map to be generated on previously recorded data allowing for data gathering over an extended time period providing a higher statistical reliability. The cloud service generates 630 the map based on the data gathered by the first robotic work tool 100.1 and on the data gathered by the second robotic work tool 100.2.

In the above it was disclosed how a robotic work tool may retrieve settings for a work area utilizing the cloud service 250.

One advantage of retrieving settings from a cloud service is that theft protection may be provided in a simple manner. The robotic work tool 100 is arranged to provide an identifier of itself as it requires settings for a work area. The identifier of the robotic work tool is matched against the work area and it is determined if the robotic work tool is authorized to operate in that work area. If not, no work area settings will be provided. Alternatively, work area settings will be provided indicating a lock down of the robotic work tool. In both cases, the robotic work tool is rendered unable to operate in the maliciously intended unauthorized manner. The settings thus comprise instructions that renders the robotic lawnmower inoperable.

Another or additional advantage of retrieving settings from and/or gathering data for a cloud service is that a fleet of robotic work tools may be organized and coordinated with a minimum of setup and manual operations.

In the above it has been disclosed how settings may be downloaded to a robotic work tool for operating in a work area. It has also been disclosed how a map may be generated based on input from a plurality of robotic work tools. The inventors have further realized that since the cloud service receives data gathered from different robotic work tools, and since the cloud service has access to maps for the work areas, the cloud service can be utilized to coordinate a fleet of robotic work tools and/or for scheduling work to be performed in a work area. The work to be performed may be scheduled based on time efficiency and/or cost efficiency.

Figure 7:
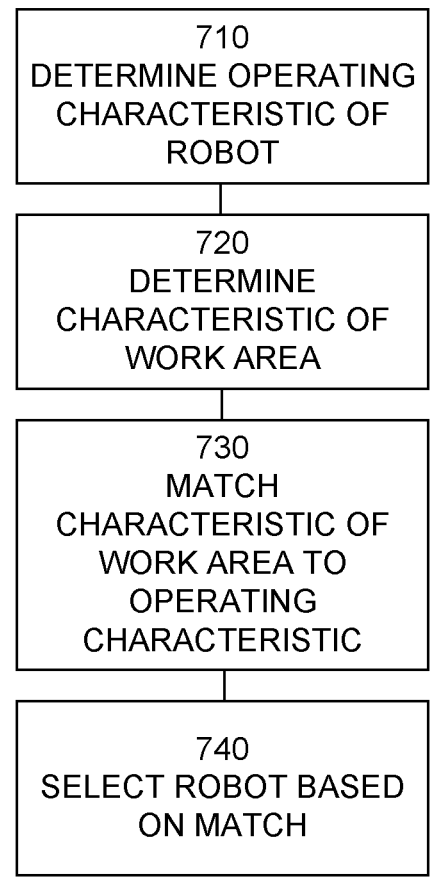
FIG. 7 shows a corresponding flowchart for a method according to an example embodiment of the teachings herein.

FIG. 7 shows a flowchart of a general method according to the teachings herein.

In one embodiment or combination of embodiments, the cloud service 250 is configured to determine 710 at least one operating characteristic or capabilities for a robotic work tool.

In one embodiment or combination of embodiments, the operating characteristic is determined by being received from the robotic work tool or from a register over the robotic work tool.

In one embodiment or combination of embodiments, the operating characteristic is determined based on gathered data. The operating characteristic may be determined based on data gathered from the robotic work tool and/or based on data gathered from another robotic work tool of a same type and/or comprising similar or the same equipment.

In one such embodiment, where the operating characteristic is the range of the robotic work tool, the range may be determined by noting and averaging the time it takes for the robotic work tool to run low on battery over time.

In one such embodiment, where the operating characteristic is the speed of the robotic work tool, the speed may be determined by noting—over time—the time it takes for the robotic work tool to run a distance.

In one such embodiment, where the operating characteristic is the operating efficiency, such as cutting efficiency, of the robotic work tool, the operating efficiency may be determined by noting—over time—the decrease in work load subjected on the robotic work tool (cutting efficiency may be measured by noting the load exerted on the cutter motor for example).

In one such embodiment, where the operating characteristic is the climbing capability of the robotic work tool, the climbing capability may be determined by noting—over time—the time it takes for the robotic work tool to climb a specific gradient.

The cloud service 250 is also configured, in one embodiment or combination of embodiments, to determine 720 characteristics of the work area, and to match 730 the characteristics of the work area to a robotic work tool whose operating characteristics matches—or are capable to service the work area characteristics, and to select that (type of) robotic work tool to be used for the work area. In one embodiment or embodiments of embodiments the cloud service 250 selects 740 a robotic work tool (or type of) by recommending or indicating the (type of) robotic work tool. In one embodiment or combination of embodiments the cloud service selects a robotic work tool (or type of) by controlling the (type of) robotic work tool to operate in the work area.

In one embodiment or combination of embodiments, the cloud service is configured to divide the work area into smaller work areas or segments, and perform the scheduling disclosed above for the segments, recommending or controlling the most suitable robotic work tool (out of the available) for the segment.

Figure 8:
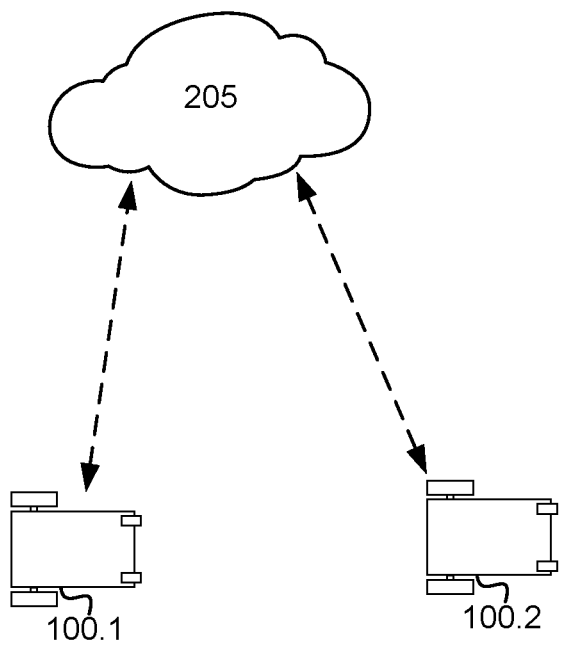
FIG. 8 shows an example of a robotic work tool system being a robotic lawnmower system according to an example embodiment of the teachings herein.
Figure 9:
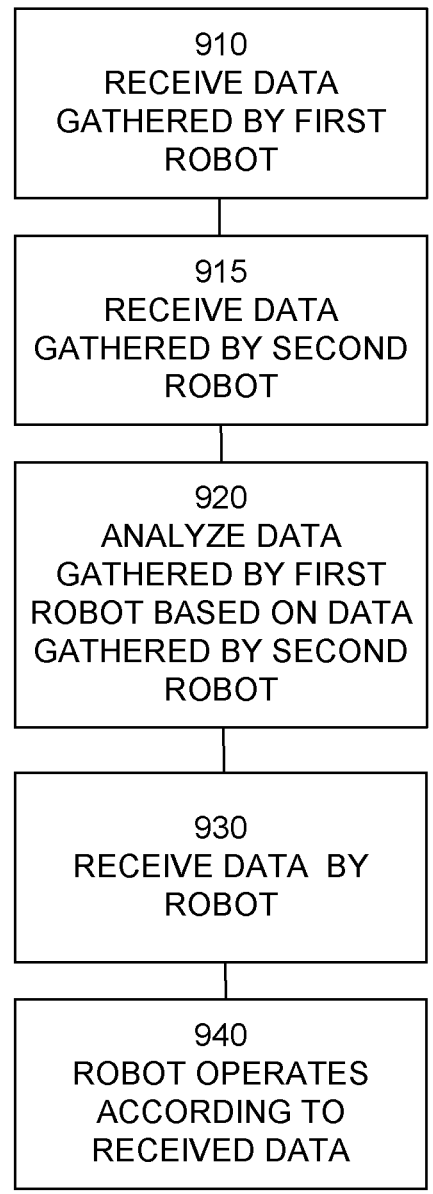
FIG. 9 shows a corresponding flowchart for a method according to an example embodiment of the teachings herein.

FIG. 8 shows a schematic view of a robotic work tool system 200 according to an embodiment of the teachings herein. The robotic work tool system 200 shown in FIG. 8 differs from the robotic work tool systems shown in FIGS. 2, 3 and 5, in that only the robotic work tools 100.1, 100.2 comprised in the robotic work tool system and the associated cloud service 250 are shown. FIG. 9 illustrates the simplicity of the robotic work tool system according to herein where a cloud service is utilized to provide settings, scheduling and or control to one or several robotic work tools based on data gathered from one or several robotic work tools. The system is highly flexible and scalable. Any component of the system may be augmented or replaced without affecting the other components of the system and any changes made will propagate through the system without user interaction being required.

FIG. 9 shows a flowchart of a general method according to the teachings herein. The cloud service 250 receives 910 data from the first robotic work tool 100.1 and analyses the data 920. The cloud service 250 also receives 915 data from the second robotic work tool 100.2 and analyses 920 the data received from the first robotic work tool 100.1 based on the data received from the second robotic work tool 100.2. The robotic work tool 100 receives 930 data from the cloud service 250, and operates 940 according to the received data. The data may comprise settings and/or control commands.

Returning to FIG. 2, the robotic work tool system may also be arranged with one or more accessory devices 240*a-c*. In the example of FIG. 2, three accessory devices are shown, but it should be noted that any number of accessory devices (zero or more) may be comprised in the robotic work tool system 200. The accessory device(s) is also configured to establish a connection with the cloud service (only indicated for the accessory device 240*a* in FIG. 2) for transmitting and/or receiving data.

In one embodiment, the accessory device is a passive device, capable of gathering data. One example of such passive accessory device is a rain sensor. If the rain sensor senses an increase in precipitation, the cloud server can direct the robotic lawnmower to postpone operation to a later time, or possibly to increase the charging times between operations to account for the heavier workload posed by the wet grass.

Another example is a camera or other presence sensor. If the camera or other presence sensor, senses or otherwise determines the presence of humans or pets, the cloud server can direct the robotic lawnmower to postpone operation to a later time or to direct the operation to another location or work area.

In one embodiment, the accessory device is an active device, capable of receiving operating data from the cloud server and to operate according to the received operating data. One example of such an active accessory device is a water sprinkler.

In one embodiment, the accessory device is both a passive and an active device, capable of gathering data and capable of receiving operating data from the cloud server and to operate according to the received operating data.

The invention claimed is:

1. A robotic work tool system comprising a robotic work tool arranged to operate in a work area, the robotic work tool comprising at least one sensor and a communication interface, the robotic work tool being configured to:
   establish a connection to a cloud service through the communication interface;
   receive data gathered by the at least one sensor and transmit the gathered data to the cloud service causing the cloud service to analyze the gathered data;
   receive operating data from the cloud service; and
   operate the robotic work tool based on the operating data received from the cloud service,
   wherein the data gathered by the at least one sensor indicates an identifier for the work area,
   wherein the robotic work tool is further configured to retrieve settings for the work area from the operating data received from the cloud service and to operate in the work area according to the settings, and
   wherein the identifier for the work area is a specific signal appended to a control signal for a charging station.

2. The robotic work tool system according to claim 1, wherein the robotic work tool is further configured to transmit the gathered data indicating the identifier for the work area to the cloud service during startup, during a setup mode and/or during operation.

3. The robotic work tool system according to claim 2, wherein robotic work tool is further configured to determine that a border of the work area has been crossed and in response thereto transmit the gathered data indicating the identifier for the work area to the cloud service.

4. The robotic work tool system according to claim 1, wherein the operating data is based on data gathered from a second robotic work tool.

5. The robotic work tool system according to claim 1, wherein the settings received include instructions for entering a special mode for operating in a second work area without charging capabilities.

6. The robotic work tool system according to claim 1, wherein the robotic work tool is further configured to retrieve the identifier for the charging station by sensing and processing a control signal transmitted by the charging station.

7. The robotic work tool system according to claim 1, wherein the robotic work tool is further configured to determine a position of the robotic work tool and base identification of the work area on the determined position.

8. The robotic work tool system according to claim 1, wherein the robotic work tool is configured to cause the cloud service to determine if the robotic work tool is authorized to operate in the work area by the robotic work tool providing an identifier of the robotic work tool causing the cloud service to match the identifier of the robotic work tool against the work area and determine if the robotic work tool is authorized to operate in the work area, and if the robotic work tool is not authorized to work in the work area, the settings include instructions to render the robotic work tool inoperable.

9. The robotic work tool system according to claim 1, wherein the robotic work tool is configured to cause the cloud service to schedule operation of the robotic work tool based on operating characteristics of the robotic work tool, and wherein the operating data comprises scheduling data.

10. The robotic work tool system according to claim 1, wherein the robotic work tool is configured to cause the cloud service to coordinate a first and a second robotic work tool so that the work area is best serviced, and the robotic work tool is configured to receive coordination data from the cloud service.

11. The robotic work tool system according to claim 10, wherein the coordination data is based on operating characteristics of the first and second robotic work tools.

12. The robotic work tool system according to claim 1, wherein the robotic work tool is configured to cause the cloud service to determine characteristics of the work area, and to match the characteristics of the work area to a selected robotic work tool whose operating characteristics match or indicate a capability to service the characteristics of the work area, and to select a type of work tool as the selected robotic work tool to be used for the work area.

13. The robotic work tool system according to claim 9, wherein the operating characteristics are based on data gathered from a second robotic work tool.

14. The robotic work tool system according to claim 9, wherein the operating characteristics define a range of the robotic work tool, the speed of the robotic work tool, the operating efficiency of the robotic work tool and/or the climbing capability of the robotic work tool.

15. The robotic work tool system according to claim 1, wherein the robotic work tool is further configured to cause the cloud service to analyze the gathered data, based on data gathered by a second robotic work tool.

16. The robotic work tool system according to claim 15, wherein the robotic work tool is further configured to, by transmitting the data gathered, cause the cloud service to generate a map of the work area.

17. A robotic work tool system comprising a robotic work tool arranged to operate in a work area, the robotic work tool comprising at least one sensor and a communication interface, the robotic work tool being configured to:
  establish a connection to a cloud service through the communication interface;
  receive data gathered by the at least one sensor and transmit the gathered data to the cloud service causing the cloud service to analyze the gathered data;
  receive operating data from the cloud service; and
  operate the robotic work tool based on the operating data received from the cloud service,
  wherein the robotic work tool system is characterized in that the robotic work tool is configured to cause the cloud service to coordinate a first and a second robotic work tool so that the first and second robotic work tools are coordinated to service the work area according to their capabilities, selecting the robotic work tool based on their capabilities for a given task, and the robotic work tool is configured to receive coordination data from the cloud service, wherein the coordination is based on operating characteristics of the first and second robotic work tools and wherein the operating characteristic is the climbing capability of the robotic work tool.

* * * * *